(12) United States Patent
Tourrilhes et al.

(10) Patent No.: US 11,805,060 B2
(45) Date of Patent: Oct. 31, 2023

(54) TOKEN BUCKET WITH ACTIVE QUEUE MANAGEMENT

(71) Applicant: HEWLETT PACKARD ENTERPRISE DEVELOPMENT LP, Houston, TX (US)

(72) Inventors: Jean Tourrilhes, Milpitas, CA (US); Puneet Sharma, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 24 days.

(21) Appl. No.: 17/554,935

(22) Filed: Dec. 17, 2021

(65) Prior Publication Data
US 2023/0198910 A1   Jun. 22, 2023

(51) Int. Cl.
*H04L 47/215*   (2022.01)
*H04L 47/625*   (2022.01)
*H04L 47/32*    (2022.01)

(52) U.S. Cl.
CPC ............ *H04L 47/215* (2013.01); *H04L 47/32* (2013.01); *H04L 47/6255* (2013.01)

(58) Field of Classification Search
None
See application file for complete search history.

(56) References Cited

U.S. PATENT DOCUMENTS

| | | | | |
|---|---|---|---|---|
| 2003/0214954 | A1* | 11/2003 | Oldak | H04L 47/32 370/395.52 |
| 2005/0083845 | A1* | 4/2005 | Compton | H04L 47/32 370/235 |
| 2010/0322071 | A1* | 12/2010 | Avdanin | H04L 47/2425 370/230 |
| 2020/0014630 | A1* | 1/2020 | Jamba | H04L 47/215 |
| 2020/0382427 | A1* | 12/2020 | Nádas | H04L 47/31 |

OTHER PUBLICATIONS

Fejes, On the Incompatibility of Scalable Congestion Controls over the Internet, Jun. 22-26, 2020, IEEE, 750 (Year: 2020).*

\* cited by examiner

*Primary Examiner* — Jason E Mattis
*Assistant Examiner* — Bao G Nguyen
(74) *Attorney, Agent, or Firm* — Sheppard Mullin Richter & Hampton LLP

(57) ABSTRACT

Systems and methods are provided for a new type of quality of service (QoS) primitive at a network device that has better performance than traditional QoS primitives. The QoS primitive may comprise a token bucket with active queue management (TBAQM). Particularly, the TBAQM may receive a data packet that is processed by the token bucket; adjust tokens associated with the token bucket, where the tokens are added based on a configured rate and subtracted in association with processing the data packet; determine a number of tokens associated with the token bucket, comprising: when the token bucket has zero tokens, initiating a first action with the data packet, and when the token bucket has more than zero tokens, determining a marking probability based on the number of tokens and initiating a second action based on the marking probability.

19 Claims, 8 Drawing Sheets

TOKEN BUCKET WITH ACTIVE QUEUE MANAGEMENT

BACKGROUND

Data packets transmitted via communication networks are common. When a bulk of data packets are transmitted simultaneously, processing of these data packets can be delayed when existing network devices are unable to handle the processing capacity. As such, the number of data packets causes network congestion in the wider communication network.

One metric to help minimize network congestion involves defining a predetermined incoming packet rate. However, incoming packet rates can vary in a set of network devices in the communication network. If any network device involved in the processing of data packets receives packets at a higher rate than it can process, then the data packets can back up, which can give rise to a delayed queue of data packets.

Larger scale data processing congestion can occur when network devices are overloaded and the number of data packets backed up in the queue becomes excessive. As a simple example, network routers have a finite amount of buffer space for queuing packets awaiting transmission over outgoing network paths. If the incoming packet rate is too high, queue lengths can increase to the point where router buffers are too full to adequately process incoming and outgoing traffic. In some cases, data packets are dropped and may cause data loss or further delay.

Traditionally, communication networks offer a "best effort" services, where all users of the network can receive the same level of service. However, a network quality of service (QoS) policy can allow the network to offer different level of service to different users, connections, data types, protocols, requesting devices, network environments, geographic locations, etc. For example, some users may receive from the network higher priority, higher bandwidth, or lower latency. QoS can be implemented via network devices and network traffic rules using QoS primitives that are implemented in the network devices.

A QoS primitive executes on a network device and performs various tasks related to QoS policies. In some examples, the QoS primitive can process packets and enforce QoS policies in the network. In other examples, the QoS primitive can inform devices of the QoS requirements in a platform independent implementation, process data packets, and make decisions that impact the level of service received by the packet, such as when the packet will be forwarded by the device. Some example QoS primitives include a priority queue (e.g., each data packet has a priority value associated with it and the data packet with the highest priority is transmitted/processed first) and communication traffic policer (e.g., monitor data traffic to enforce the QoS policy associated within, and discarding or marking non-compliant data traffic).

BRIEF DESCRIPTION OF THE DRAWINGS

The present disclosure, in accordance with one or more various examples, is described in detail with reference to the following figures. The figures are provided for purposes of illustration only and merely depict typical examples.

Figure 1:
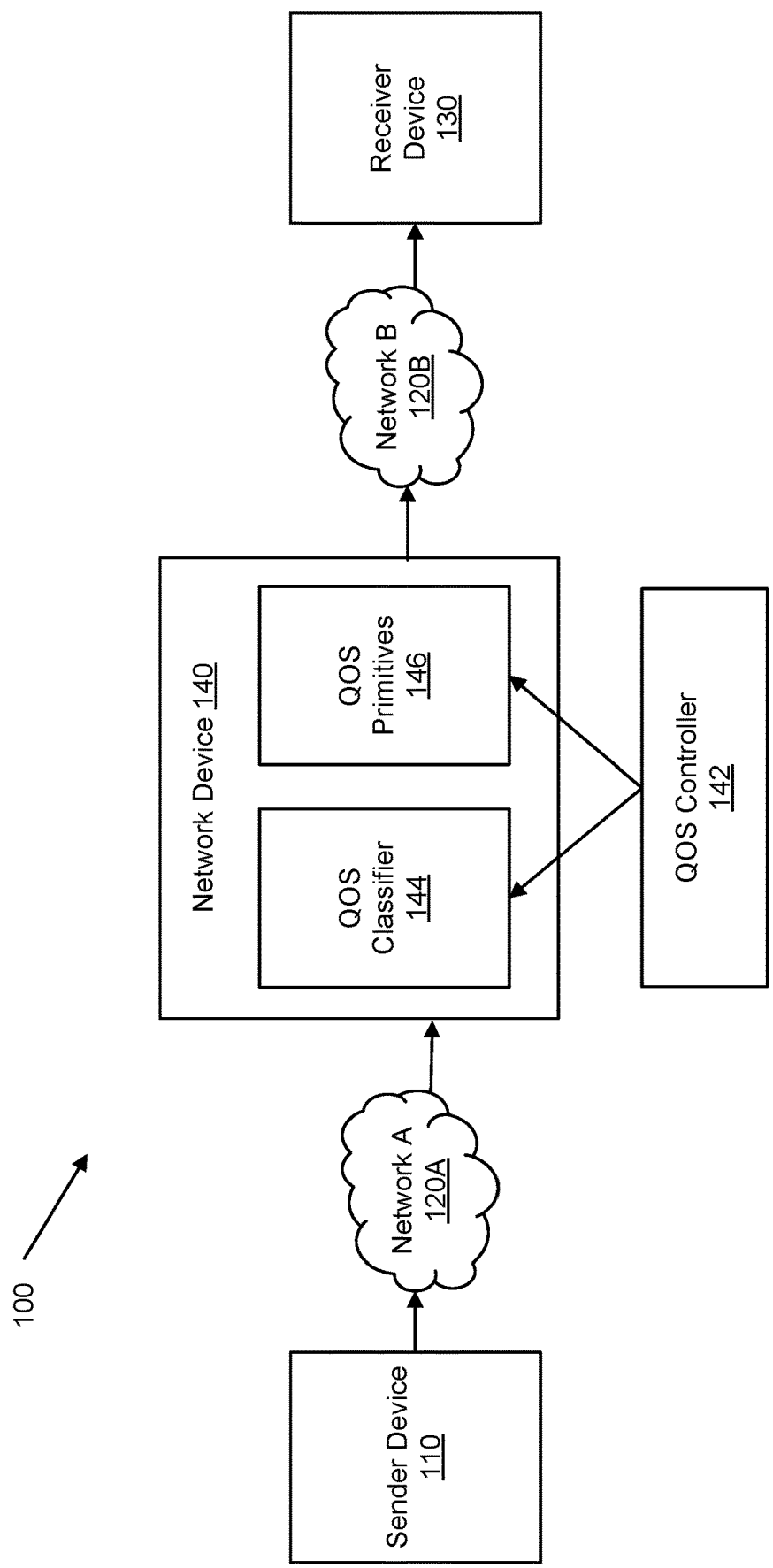
FIG. 1 illustrates a communication network using a QoS policy, in accordance with some examples of the disclosure.

The figures are not exhaustive and do not limit the present disclosure to the precise form disclosed.

DETAILED DESCRIPTION

Existing QoS primitives have limitations. For example, priority queues can have difficulty scaling to a large number of QoS classes (e.g., more than one thousand). In another example, policers can have poor performance with common Transmission Control Protocol/Internet Protocol (TCP/IP) traffic.

Examples of the application describe a token bucket with active queue management (TBAQM), which can correspond with a new type of QoS primitive that has better performance than traditional QoS primitives. The TBAQM can limit the transmission or acceptance rate of network traffic by not using a queue (like most standard QoS primitives), but rather a policer implemented using a token bucket (e.g., where the policer uses the token bucket state as input). For example, as the policer of the TBAQM processes the packets, it may make a decision immediately to perform one of the following: let the packet pass unmodified, change a header value and then let the packet pass, or drop the packet. Which action is taken is based on the number of tokens in the token bucket and the output of the TBAQM.

The TBAQM also improves upon standard QOS primitives by incorporating any AQM algorithm (e.g., designed for a queue and that rely on a standard queue length or estimated dequeue rate to regulate traffic or packet processing). For example, the TBAQM is implemented with a proportional integral controller algorithm, where the queue length variable is replaced by the difference between the bucket size and the number of tokens and where the estimated dequeue rate is replaced by the configured rate of the token bucket.

The TBAQM QoS primitive can reduce jitters and bursts on the communication network, making TCP traffic more smooth across the communication network, minimize time when the communication network is oversubscribed, and minimize time when TCP cannot use the bandwidth provided by the QoS primitive. In some examples, the TBAQM QoS primitive is an improved policer and, because it's a policer, it can also implement greater scalability than priority queues.

Technical improvements are realized throughout the disclosure. For example, the token bucket with active queue management (TBAQM) described herein can reduce congestion, implement a large data packet burst size to increase efficiency of packet transmission across the network, and decrease packet losses. This can improve the data network overall. These technical improvements may be realized by users relying on the communication network as well. For example, real-time applications (e.g., streaming video) will be less frequently impacted by high network usage and dropped data packets or network transmission hiccups from TCP applications may be reduced.

Additionally, the TBAQM can create a scalable QoS primitive that has good performance with TCP congestion control. It can replace conventional token buckets with less sensitivity to the configuration of the burst size, better regulation of TCP throughput, and better support of bursty traffic.

Further, the TBAQM can be implemented in hardware and software in any network device to implement QoS control and rate limiting. When implementing packet processing as a service, the TBAQM can improve the QoS offering to users, enabling users better management of their network. The improved scalability can correlate with finer grained QoS implementations and a large set of tenants or applications can be supported.

FIG. 1 illustrates some traditional forms of implementing a communication network using a QoS policy, in accordance with some examples of the disclosure. In the illustrative computing environment 100, sender computing device 110, network 120, and receiver computing device 130 are provided.

In this illustration, sender computing device 110 transmits one or more data packets to receiver computing device 130 via networks 120 (illustrated as first network 120A and second network 120B). Sender computing device 110 and receiver computing device 130 (e.g., clients, servers) may be endpoints in a communication network that connects the endpoints. Various sender computing devices may send data packets to various receiver computing devices, although a single sender computing device and a single receiver computing device is provided for simplicity of explanation.

Computing environment 100 can connect these and other computing devices (e.g., client devices or servers) to forward data packets and allow for data transmissions between sender computing device 110 and receiver computing device 130 via network 120. Each of these devices can forward data packets from a source to a destination, whether or not the source is the original device that generated the data packet or original recipient that will ultimately receive the data packet. Each of these devices may exist along the network path, which can cross multiple network devices.

The default forwarding behavior of a network device computing environment 100 in can correspond with a "best effort" to transmit the data packet. Every packet is forwarded the same way, so every user of the network can receive the same level of service in transmitting its data. Best effort for network is most often based on data packets, so every user gets the same opportunity to forward the data packet.

Computing environment 100 may enable data packet transmissions using a QoS policies. The QoS policies can offer different level of services for transmitted data packets via network 120. In some examples, the QoS policies can correspond with a number of QoS classes or QoS policies, where each QoS class is the unit of management for QoS policies. Each QoS class can also correspond with a different level of service. For example, a QoS class may get higher priority, higher bandwidth, or lower latency than another QoS class. Traffic from users and network devices can be associated to the various QoS classes based on complex policies implemented by network device 140.

Network device 140 can be broadly separated in three parts, including QoS controller 142, QoS classifier 144, and QoS primitives 146. In some examples, QoS controller 142 is implemented outside of network device 140, and a single QoS controller 142 can manage a plurality of QoS devices. In some examples, QoS primitives 146 may comprise a scheduler. In some examples, network device 140 can be thought of as including these three QoS related parts, the QoS controller 142, the QoS classifier 144, and the QoS primitives 146. The QoS primitives 146 generally process packets, implement the QoS class, and enforce the QoS policy. QoS primitives 146 may decide what is the packet priority, when the packet will be forwarded, or if the packet should be dropped. The QoS primitives 146 may be configured manually by an admin or dynamically by the QoS controller 142.

QoS controller 142 is configured to manage QoS policies. It may assign users to classes based on identity, user needs and QoS policies, and may verify that users don't violate the term of the policy. It may manage the QoS policies, and may change the overall allocation of network resources to meet the goal of each policy. In some examples, QoS controller 142 is not implemented programmatically and the network administrator statically configures the QoS policy in the network devices.

QoS classifier 144 is configured to recognize the traffic and associate it with its corresponding QoS class. There are many different ways to implement such classifier. In some case, the application on the sender device can tag its traffic with the QoS class, for example setting the differentiated services code point (DSCP) field of the TCP header with the appropriate value. In other examples, the network device may use complex packet parsing and deep packet inspection to infer the QoS class from the traffic itself.

QoS primitives 146 may be implemented with the network devices that process packets, implement the QoS class, and enforce the QoS policy. It may decide what is the packet priority, when the packet can be forwarded, or if the packet should be dropped. The QoS primitives may be configured either manually by an administrative user or dynamically by QoS controller 142.

In some examples, computing environment 100 may implement one or more network queues and scheduling in QoS primitives 146. A scheduler may be part of the QoS primitives. Scheduler may be implemented with a queue or set of queues, and can decide in which order packets are processed and how often packets are processed. With a suitable set of queues and QoS classifier, very complex and elaborate QoS policies can be implemented.

Figure 2:
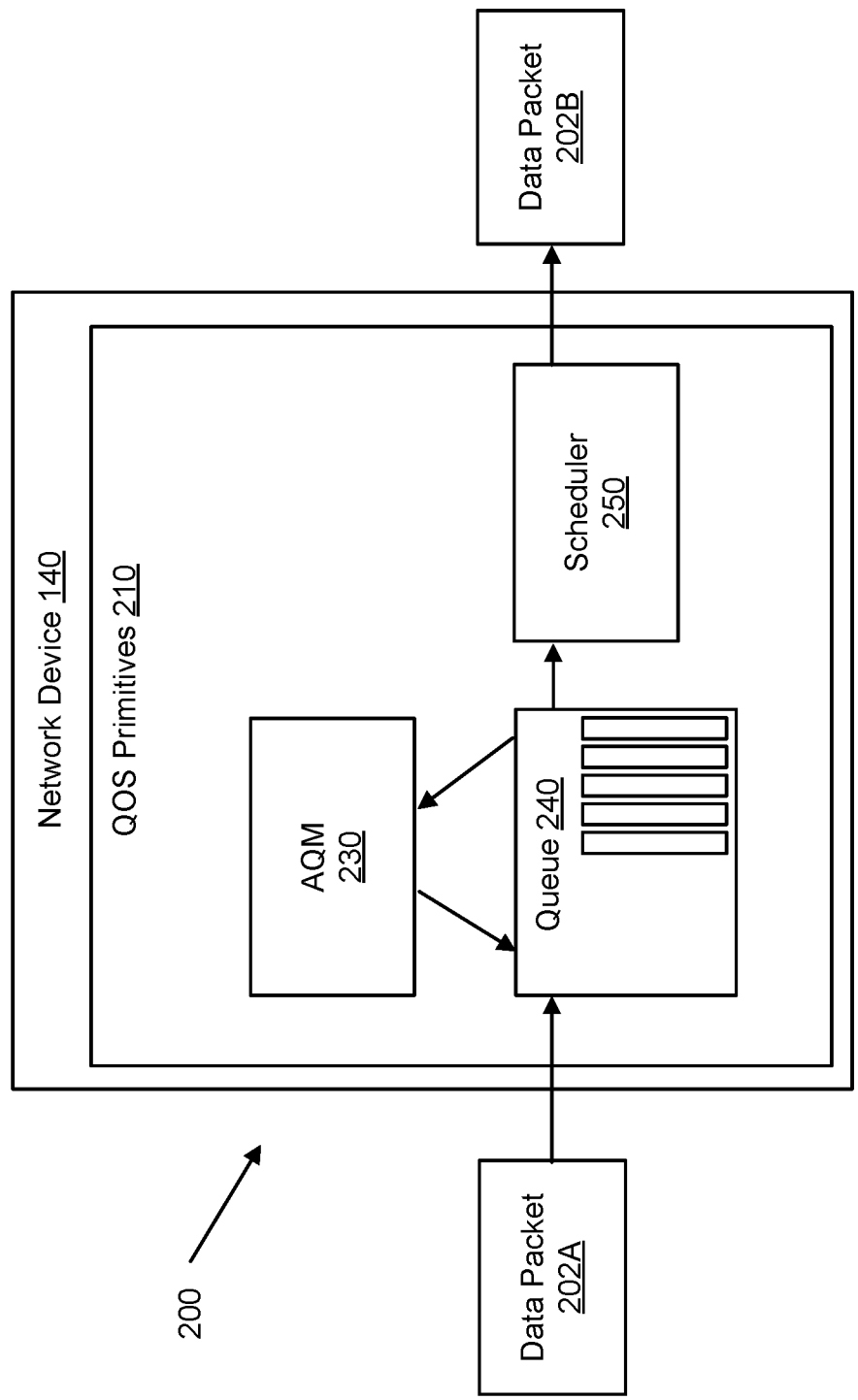
FIG. 2 illustrates processing packets to be added to a queue using an active queue management (AQM) technique, in accordance with some examples of the disclosure.

FIG. 2 illustrates processing packets to be added to a queue using an active queue management (AQM) technique, in accordance with some examples of the disclosure. In this illustration 200, active queue management (AQM) 230, queue 240, and scheduler 250 are provided to process one or more packets 202 in an updated QoS primitive 210 of network device 140. The rest of the devices and networks may remain similar to the illustrative example shown in FIG. 1, including sender computing device 110, network 120, receiver computing device 130, as well as the other components associated with network device 140 (e.g., QoS controller 142 and QoS classifier 144).

In some examples, scheduler 250 may implement prioritization. For example, some queues are given precedence over other queues. The classifier may decide in which queue the received packet should be placed. Scheduler 250 can dequeue the queues, starting with the highest priority queue. These data packets in the higher priority queues can be forwarded before data packets of lower priority queues and will experience lower latency.

In some examples, scheduler 250 can also control bandwidth. The process of controlling bandwidth by scheduler may include allocating a specific amount of bandwidth to specific queues, with each queue being be mapped to a QoS class. This mapping can managed individually (e.g., by an administrative user) and get specific level of service.

The downside of queues and scheduler 250 is that they are complex and costly to implement, and they don't scale to large number of classes. In theory, for each packet that needs to be forwarded, scheduler 250 may be configured to consult all queues to make a decision, and this may scale linearly to the number of queues. To reduce the overhead of scheduler 250, some schedulers dequeue packets from queues as batches, instead of individually, but this decreases the effectiveness of the QoS and can introduce performance issues with TCP congestion control.

The number of queues managed by scheduler 250 may be a tradeoff between the need for a greater number of QoS classes and the overhead of having more queues. In most hardware and software implementations, the number of queues may be around 1024. As the number of tenants and applications in a data center keep keeps increasing, such number is not sufficient to give one QoS class for every tenant or application.

In some examples, queue 240 is implemented as a first in first out (FIFO) queue. For example, incoming packet are just added at the tail of the queue (input) and scheduler 250 removes them from the head of queue 240 (output) for forwarding.

Some FIFO queues may have a maximum size corresponding with either a maximum number of packets or bytes. If packets arrive at the queue faster than scheduler 250 can process them, the packets may accumulate in the queue and the queue can become longer. When the queue is full, incoming packets may be dropped, which is sometimes referred to as "tail dropping." When network traffic is bursty, the queues may need to be large enough to handle a burst of traffic without dropping too many packets in normal operation.

In some examples, tail dropping may be avoided. Some reasons to avoid tail dropping is that the packet that is dropped could be retransmitted in order to avoid losing that data contained in the packet. This retransmission can take additional time and slow down processing for other packet transmissions. As such, the congestion created by packet drops can indicate that too many packets are sent to the queue using network 120.

Some traditional systems implement a version of TCP congestion control that rely on the packet loss value exclusively as the way to regulate the rate at which they are sending data and to avoid network congestion. These versions of TCP congestion control can repetitively induce tail dropping to infer when the network path is congested, and the packet losses can identify when the network is congested and can initiate TCP congestion control.

In some examples, tail dropping and large queues can lead to performance issues with TCP congestion control. With tail dropping, the TCP congestion control can stop pushing more traffic when the queue is full, so the queue may be close to full on average (e.g., within a threshold value of a maximum queue value). This makes the queuing delay high, as newly transmitted data packets may wait for the whole queue to be processed. The congestion signal represented by the packet drop may wait for the whole queue to be processed, this increases the latency of the TCP control loop and can also result in TCP oscillations and starvation.

In some examples, active queue management (AQM) 230 can remedy the defects of tail dropping. AQM 230 may implement a congestion signal with a lower delay and is finer grained. AQM 230 may add additional processing at queue 240 to drop packets before queue 240 is full. TCP congestion control reacts to those losses by reducing its sending rate. The end result is that sender computing device 110 may slow down data transmissions before queue 240 is full, the average size of queue 240 may be smaller. AQM 230 can decrease the overall delay of packets and congestion signal, which can increase the TCP performance.

In some examples, random early detection (RED) may implement AQM 230. RED can define a probability of drop based on the queue occupancy. For example, when queue 240 is almost empty, the probability value may be close to zero and the packet drop may be very unlikely. When queue 240 is almost full, the probability value may be higher and packet drop may be more likely.

Other processes may also implement AQM 230, such as Blue, Adaptive Random Early Detection (ARED), Proportional Integral controller Enhanced (PIE), and controlled delay (CoDel). In these processes, a small occupancy of queue 240 may be maintained by dropping packets preventively and proactively. The probability of drop may be based on queuing delay. For example, CoDel tries to maintain the queue delay for the data packets that are below a configured threshold.

In some examples, the use of AQM 230 can reduce packet losses, but may not completely eliminate it, as packet losses can slow down TCP congestion control. Explicit congestion notification (ECN) can add a mechanism in the TCP protocol to carry a congestion signal without dropping packets. A bit or flag in the TCP header part of the packet may be updated from zero to one to indicate congestion. For example, sender computing device 110 can set this bit to zero. In some examples, other network devices can experience congestion by setting the bit or flag as well. When receiver computing device 130 can reflect the bit to sender computing device 110. If sender computing device 110 sees the bit set, it can assume that the congestion is present and reduce its sending rate, as if that packet was dropped.

In some examples, ECN may be combined with a form of AQM 230, absent implementation of tail dropping. When the AQM 230 detects congestion at queue 240 and that packet supports ECN, instead of dropping packets, sender computing device 110 can set the ECN bit in the TCP header to signal that congestion.

However, ECN may not be supported by all implementations. So, when the network experiences congestion, the device that implements AQM 230 can mark packets that need to carry the congestion signal. If the packet supports ECN, the packet may be marked. This marking can result in modifying the packet to set the ECN bit. Otherwise, marking the packet can result in the packet being dropped.

The ECN bit can identify congestion in the network and replace packet loss. The ECN bit can have a statistical property. In particular, packet losses may be low to avoid network inefficiencies, so the probability of AQM 230 dropping a packet or setting the ECN bit may be low (e.g., around one to two percent in practice).

Having such a low probability of congestion signal may be problematic in practice. The congestion signal may be generated for fairly strong levels of congestion. The congestion may accumulate for some time before the ECN signal is sent. The reaction of sender computing device 110 to such signal may to may be strong, because it indicates strong congestion. As such, in practice, the signal may not be sent often in accordance with the stored instructions and rules. This may result in delay when notifying sender computing device 110 of the new congestion level. This delay can make the overall feedback loop of the control system fairly slow and unstable.

In some examples, the signal congestion experienced (SCE) process may be implemented as a finer grained congestion signal. For example, SCE may correspond with an adaptation of the congestion signal in data center TCP (DCTCP), which is not related to packet loss. In implementations of SCE, a bit/flag can be sent more often than ECN and can be associated with lower levels of congestion. In some examples, the probability of SCE in the stream of packets can encode an actual level of congestion in the network. The SCE can help TCP congestion control adapt closer and faster to the actual congestion, for example, by identifying network congestions without waiting until the queue is full.

Figure 3:
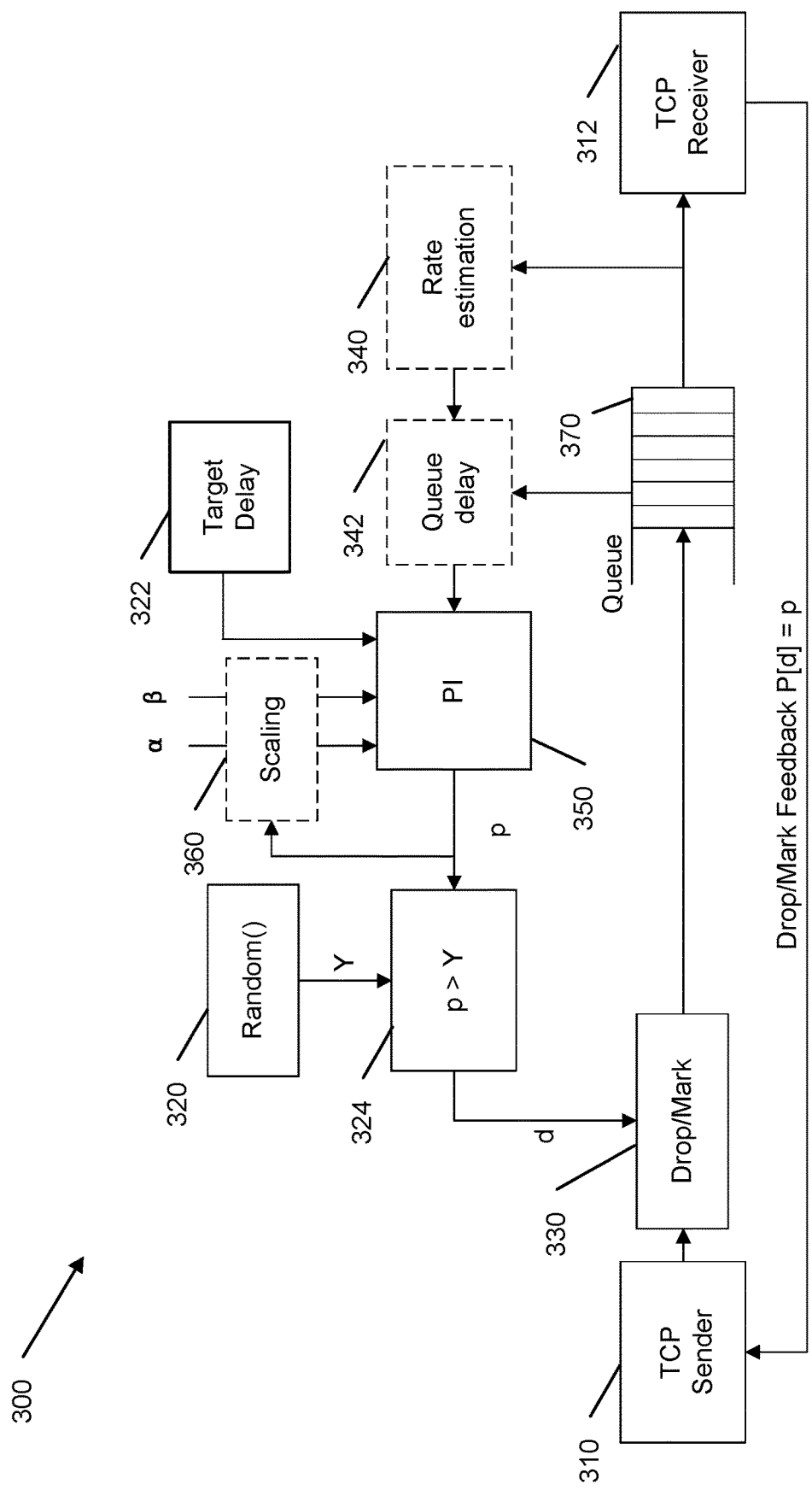
FIG. 3 illustrates processing packets to be added to a queue using an AQM technique using a PI controller, in accordance with some examples of the disclosure.

FIG. 3 illustrates processing packets to be added to a queue using an Active Queue Management (AQM) technique using a PI controller, in accordance with some examples of the disclosure. For example, processing packets may be added to a queue using the Proportional Integral controller Enhanced (PIE) or Proportional Integral improved with a square ($PI^2$) algorithms, which may correspond with AQM techniques using the PI controller.

In illustrative example 300, both PIE and $PI^2$ AQMs are shown. For example, when a packet arrives, PI controller 350 can compute a marking probability of data packets, 'p' and can estimate the queuing delay 342. The queuing delay 342 may be based on the length of the queue 370 and the estimated dequeue rate 340. PI controller 350 may then compare queuing delay 342 to target delay 322, and determine the difference between queuing delay 342 to target delay 322. A standard policer may not implement a marking probability based on the number of tokens or implement a second action based on the marking probability.

PI controller 350 may compute the probability of marking packets 'p' 360 based on the difference between queuing delay 342 to target delay 322 and using parameters alpha and beta. For example, alpha and beta may configure the strength of the reaction of PI controller 350. In some examples, alpha and beta may be adjusted so that PI controller 350 reacts fast enough but does not over-react.

The probability of drop 'p' is compared 324 to a pseudo random process 320. The comparison may help decide whether to mark the incoming packet. If the incoming packet is determined to be marked, marking block 330 will mark the packet by, for example, either "drop the packet" or "change the ECN bit in the header." If the incoming packet is determined not to be marked, then it passes to queue 370 unmodified.

In some examples, proportional integral (PI) controller 350 may be implemented with computing environment 300 to assist sender computing device 310 and receiver computing device 312. PI controller 350 can maintain a process variable (PV) at a particular set point (SP). For example, PI controller 350 can measure the error (e.g., the difference between PV and SP) and include two feedback components, one that is proportional to the error and one using the integral of the error. The proportional component can provide a bigger correction when the two values are far apart, and smaller correction as the two values are close (e.g., within a threshold value). The integral component can eliminate biases in the sensing and actuation by tracking how the proportional component misses the target.

Proportional integral enhanced (PIE) process can apply PI controller 350 and the control theory to AQM. The goal of the PI controller 350 is to maintain the queuing delay 342 of packets below a specific duration. PIE may not directly impact the sending rate of packets at sender computing device 310, so PI controller 350 can generate congestion signals using packet losses or setting ECN to achieve its goal. In some examples, the queuing delay 342 may not be measured, but rather inferred from the queue length 370 and the estimated output rate of the queue 340. The PIE process can derive the optimal packet marking probability from the predicted queuing delay 342. The packet marking can be implemented by dropping the packet or setting the ECN bit in the header of the packet.

The $PI^2$ process may improve PIE by implementing the same PI controller 350 and changing the formula and heuristics to derive packet marking to be more universal and simpler. The $PI^2$ process may generate finer grained congestion signals which is somewhat similar to the SCE process.

In some examples, a rate limiter is implemented in QoS primitive 146 of computing environment 100. Rate limiting may help to enforce the network policy. For example, the rate limiter may be used to confirm that the traffic does not exceed a certain rate. This can be implemented for a policy reason (e.g., as the result of a contractual agreement) or to smooth out the burstiness of the traffic across network.

Rate limiting may be implemented as a shaper. The shaper can correspond with a queue, where the scheduler can process packets no faster than the committed rate. The queue in the shaper can help handle the burstiness of traffic and smooth out traffic, but may also add delay. The shaper may behave like other queues discussed herein and may correspond with the same scalability issues.

Rate limiting may be implemented as a meter or policer. The policer can enforce the committed rate by discarding the excess traffic. The policer may not have a queue. Rather, the policer may process packets instantly and decide if the packet should be kept, dropped, or some part of the header modified.

One of the challenges for the policer is how to handle common traffic burstiness. For example, if traffic arrives in a burst, the instantaneous rate may exceed the committed rate during the burst. If the traffic arrives between bursts, the policer may be idle for some time and the instantaneous rate may be lower than the committed rate. In some examples, the policer may include a bursting mechanism that enables average bandwidth utilization across the bursts. The policer may also enable the traffic to exceed the committed rate in the short term, as long at the longer term average of the traffic does not exceed the committed rate.

In some examples, a token bucket or leaky bucket may be implemented. The token bucket may implement a rate limiter, a shaper (e.g., with a queue), or a policer (e.g., with dropping packets). The leaky bucket may be similar to a token bucket used as a shaper.

Figure 4:
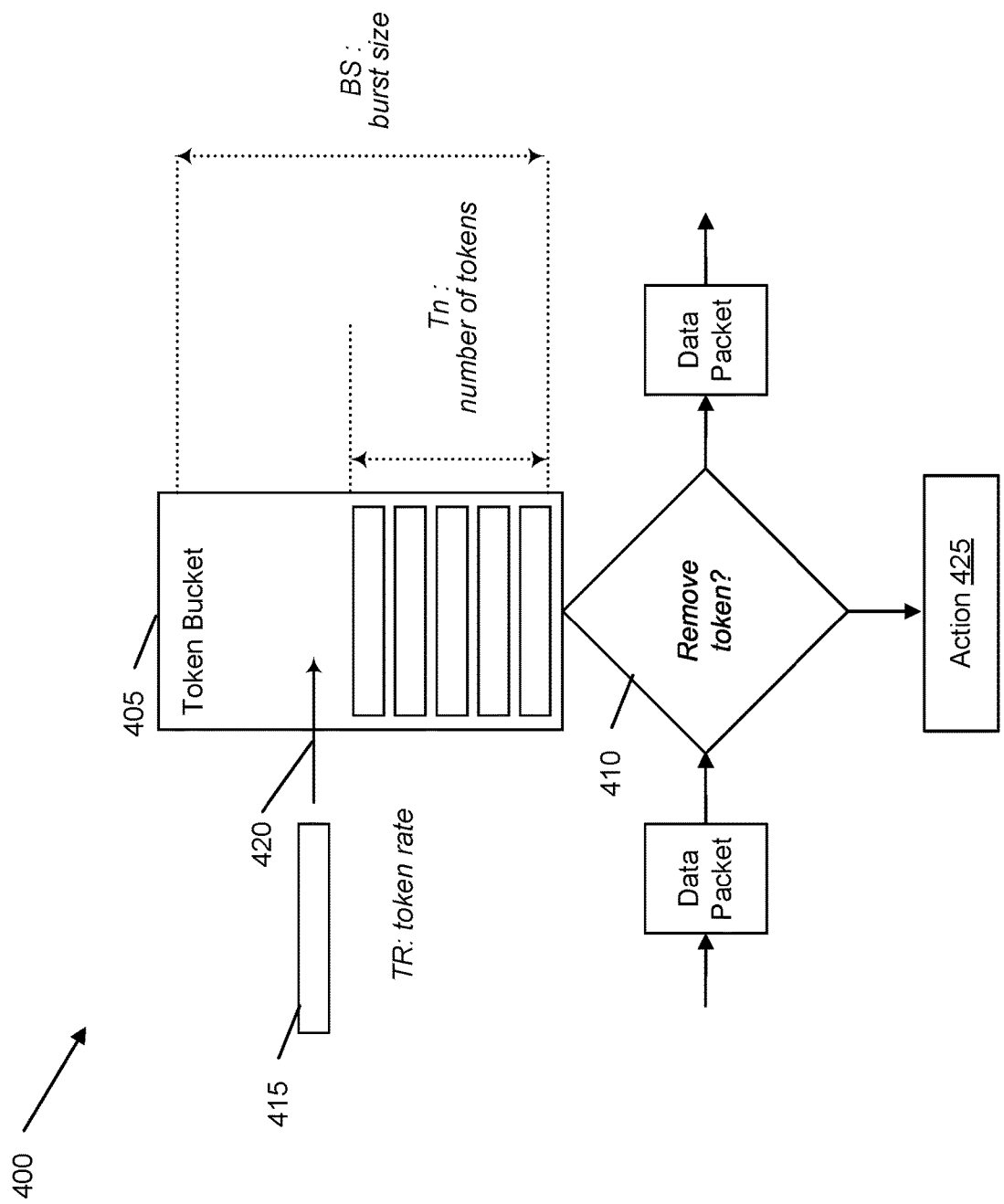
FIG. 4 illustrates processing packets, refilling tokens, and removing tokens from a policer implemented using a token bucket, in accordance with some examples of the disclosure.

FIG. 4 illustrates processing packets, refilling tokens, and removing tokens from a policer implemented using a token bucket, in accordance with some examples of the disclosure. The illustrative policer 400 includes token bucket 405 with a plurality of tokens 415 that are added and removed from token bucket 405, as described herein.

Token bucket 405 of policer 400 may try to enforce a long term rate for the traffic passing through it (e.g., sometimes called target rate or committed rate). The enforcement may be implemented by dropping packets that exceed the committed rate. Some network traffic may be both discrete (e.g., the packets may not be split) and bursty, so token bucket 405 may include a mechanism for averaging enforcement.

Policer 400 may perform an action 425 with the packet. The action 425 may enforce an existing rule in order to, for example, keep, drop, or modify the packet in some way (e.g., the header of the packet). In some examples, the action 425 may be implemented by dropping packets that exceed the committed rate. Alternatively, the action 425 may be implemented by changing the drop precedence value in the DSCP field of the packet header, which may cause those packets to be dropped in subsequent processing.

Token bucket 405 may be a container of virtual credits or tokens 415, which can allow smooth and average instantaneous variations in input traffic. For example, when a packet is ready to be forwarded, a number of credits or tokens 415 may be removed from token bucket 405 at block 410.

In some examples, an action 425 may be performed based on the number of tokens in the token bucket 405. If token bucket 405 is empty (e.g., zero tokens), no token can be removed and the packet may be dropped as action 425. Token bucket 405 may be refilled with tokens 415 at a constant rate (e.g., the desired committed rate) at block 420 and the size of token bucket 405 may correspond with a burst size (BS) and/or a maximum capacity. When token bucket 405 is full, new tokens may be discarded, so that the token bucket does not grow beyond its maximum size BS and to prevent excessively long burst of packets.

Token bucket 405 may create variations in the instantaneous output rate. If the input traffic rate is below the target rate for some time, token bucket 405 may become full. If new traffic arrives at token bucket 405, its output rate may be unconstrained as long as tokens are available in token bucket 405. The burst of packets can have a rate much higher than the target rate (e.g., the burst rate). When token bucket 405 is finally empty, the target rate may be enforced on the traffic and/or other new data packets. In some examples, policer 400 does not have a queue to handle traffic variations and burstiness (e.g., rather it has token bucket 405). In these examples, token bucket 405 may use a bursting mechanism allowing traffic to exceed its committed rate in the short term.

In some examples, the policer 400 may not have a queue to handle traffic variations and burstiness (e.g., as illustrated with FIGS. 2 and 3). Instead, the policer 400 may use a bursting mechanism allowing traffic to exceed its committed rate in the short term. This configuration of the bursting mechanism is done using burst size BS, the maximum number of tokens that can accumulate in token bucket 405. The burst size BS may represent a number of packets or bytes.

The configuration of the bursting mechanism may sometimes cause poor performance of policers. When the burst size BS is too small, the policer 400 may not accommodate a common traffic burst. For example, the tail end of the traffic burst may exceed the number of tokens available in token bucket 405 and the tail end of packets may be dropped. The packet drops may impact TCP which can reduce sending rate. On the other hand, the idle time between bursts may not be fully credited to the rate average because not enough tokens can accumulate in token bucket 405. In this instance, the policer may be underutilized and the traffic may not take advantage of the full committed bandwidth.

When the burst size BS is too big, the policer 400 may produce long sequences of packets that exceed the committed rate. For the duration of the burst, that policer 400 may not protect the network downstream from the excess traffic and the long sequences may impact the QoS of other traffic competing downstream. The excess traffic may overflow the downstream queues. In some examples, the long sequences may also increase the TCP reaction time, since it may take more time for TCP to see the congestion loss. This may make TCP congestion control unstable, as TCP alternately sees a congested and uncongested path.

The burst size BS can be configured as a tradeoff between too small and too big. Some tradeoffs can depend on the traffic characteristics, such as the type of TCP congestion control, the overall round trip time of that particular path, and the timing behavior of other network devices (e.g., devices upstream of the policer 400, devices that are not known in advance, or devices that may change over time). In some examples, the policer 400 may not be configured to deliver both good TCP performance and minimal impact (e.g., downstream network paths with large bandwidth delay).

As such, traditional network solutions may be inadequate for managing packet delay (e.g., because of the difficulty of managing the bursting mechanism, the preference to deploy shapers which are much more predictable and have better performance).

Policer 400 can implement a rate limiting of network traffic using token bucket 405. For example, token bucket 405 may make a decision immediately to perform one of the following actions 425: let the packet pass unmodified, change a header value and then let the packet pass, or drop the packet. For the system to determine a particular action 425 may be based on the number of tokens in token bucket 405. In some examples, the action 425 is taken only if the number of tokens is zero in token bucket 405. In some examples, the action 425 is taken depending on the policer configuration and information present in packet header (e.g., the value of the drop precedence in the DSCP field of the packet header or other values in the header of the data packet).

Figure 5:
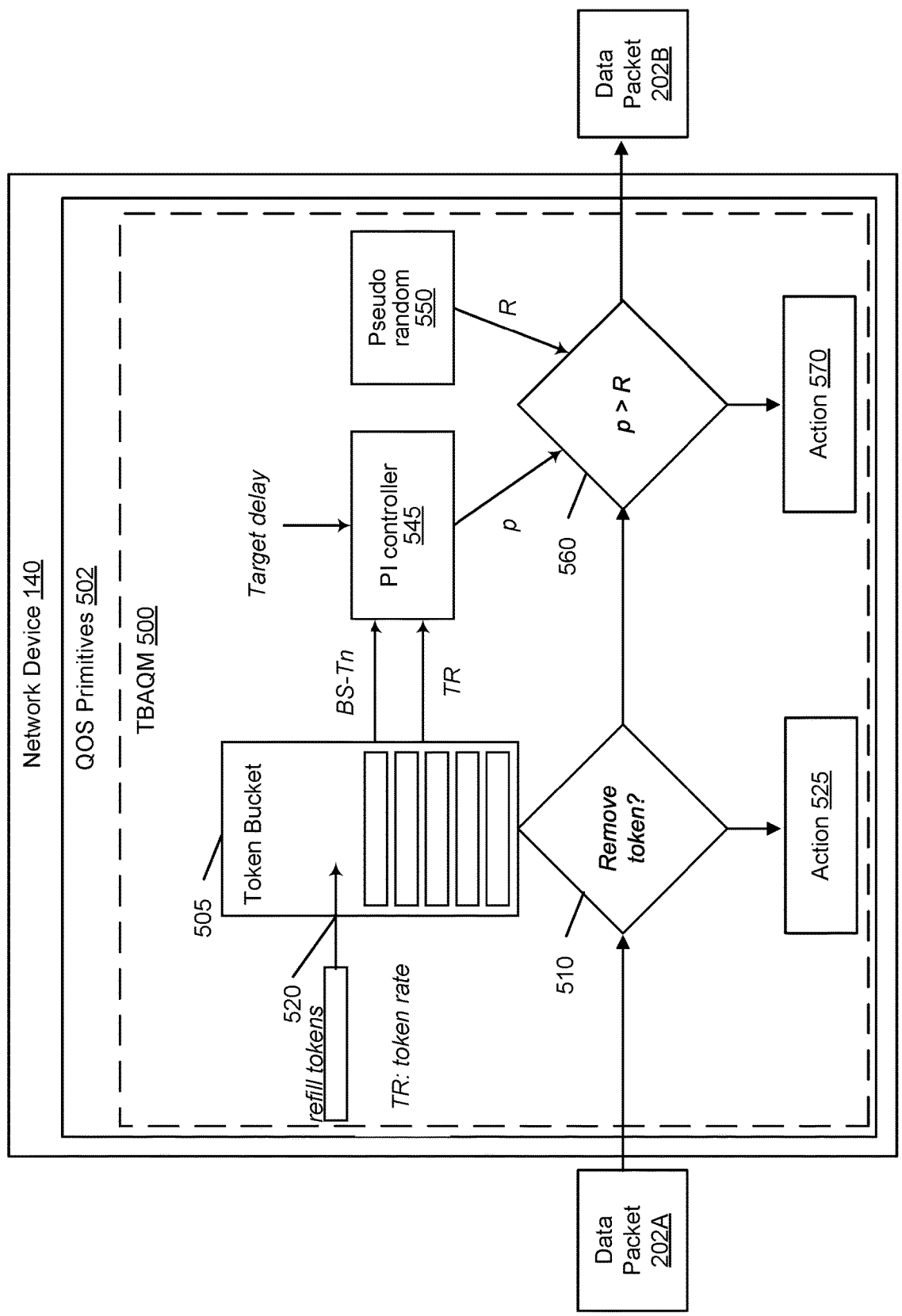
FIG. 5 illustrates different components of the token bucket with active queue management (TBAQM) and how it processes packets, in accordance with some examples of the disclosure.

FIG. 5 illustrates different components of the token bucket with active queue management (TBAQM) and how it processes packets, in accordance with some examples of the disclosure. The TBAQM 500 may be an updated QoS primitive 502 of network device 140. QoS primitive 502 may implement TBAQM 500. The rest of the devices and networks associated with network device 140 may remain similar to the illustrative example shown in FIG. 1, including sender computing device 110, network 120, receiver computing device 130, as well as the other components associated with network device 140 (e.g., QoS controller 142 and QoS classifier 144).

In some examples, TBAQM 500 implements an improved policer from the policer 400 illustrated in FIG. 4. Since TBAQM 500 implements a policer, it can also implement greater scalability than priority queues implemented as standard QoS primitives. TBAQM 500 may make traffic more smooth, minimize time when the communication network is oversubscribed, and minimize time when TCP cannot use the bandwidth provided by some QoS primitive implemented in other systems, like the policer 400 using token bucket illustrated in FIG. 4, as described herein.

TBAQM 500 may be an improved QoS primitive 502 to rate limit traffic using a token bucket 505 and PI controller 545 to generate fine grained congestion signals and better interact with TCP congestion control. TBAQM 500 may improve on traffic queues and policers by having both great scalability and good performance with TCP traffic. TBAQM

500 may implement processes to (1) rate limit traffic to a configured bandwidth, (2) integrate in existing QoS frameworks, (3) increase scalability to help support a large number of QoS classes without performance degradation and limited implementation footprint, (4) improve performance with a maximum TCP traffic throughput being close to the configured bandwidth and QoS downstream of TBAQM 500 is maintained at small time frame.

The token bucket 505 can be implemented with TBAQM 500. The token bucket 505 may help implement rate limiting of network traffic by not using a queue, but rather a policer 560 with the state of the token bucket 505 as input. For example, as the policer processes the packets, it may make a decision immediately to perform one of the following actions at 525, 570: let the packet pass unmodified, change a header value and then let the packet pass, or drop the packet. Which action is taken is based on the number of tokens in the token bucket and the output of the TBAQM.

In some examples, action 525 may perform similar actions to the actions described with action 425 in FIG. 4. For example, the action 525 may enforce an existing rule in order to, for example, keep, drop, or modify the packet in some way (e.g., the header of the packet). In some examples, the action 525 may be implemented by dropping packets that exceed the committed rate. Alternatively, the action 525 may be implemented by changing the drop precedence value in the DSCP field of the packet header, which may cause those packets to be dropped in subsequent processing.

In some examples, action 570 may differ from action 525 in the timing of performing various actions. For example, whether the action 570 is taken is based on the output of PI controller 545. Which action 570 is performed may be based on the configuration of the TBAQM 500.

In some examples, by using token bucket 505, TBAQM 500 may implement early losses using action 570 instead of waiting for the bursting mechanism to run out of tokens and apply action 525. For example, the token bucket 505 may implement a bursting mechanism to average bursty traffic. Experience with AQM and queues has shown that TCP can perform better when the congestion signal (e.g., the bit/flag or packet drop) is transmitted earlier than determining that the queue is full. Similarly, TCP can perform better when the congestion signal is transmitted earlier by TBAQM 500 than determining that the token bucket has run out of tokens.

In some examples, the solutions to solving the congestion may be more gradual and proportional to the level of congestion. In this way, the congestion signal may be sent to the sender device 110 earlier than traditional policers so that the TBAQM 500 can start signaling congestion before the token bucket 505 runs out of tokens.

TBAQM 500 may provide good TCP performance, even though the performance of TCP congestion control over a complex network path is very difficult to predict. There exist many variations of the TCP congestion control and the system may not know which TCP congestion control is used for each traffic source using the token bucket. Additionally, the TCP congestion control may be a moving target as new TCP congestion controls are designed to better take advantage of modern networks and AQM.

TBAQM 500 may be similar to existing the AQM process, which implements a queue rather than a token bucket, as described herein. TBAQM 500 may replace the queue with token bucket 505 that can respond to congestion in the same way as a queue with AQM, yet improved from a queue in that it can allow to smooth and average instantaneous variations in input traffic. In other words, the profile of congestion signals for different congestion levels can be similar to the AQM queue. In this way, TBAQM 500 can take portions of an existing AQM designed for use with a queue and adapt it to work in the context of a token bucket, while also creating new properties that would depend on traditional queue properties.

An illustrative flow using TBAQM 500 is also provided. For example, tokens may be added to the token bucket 505 (e.g., as an initial step) at block 520. In some examples, the tokens may be added based on a configured rate and subtracted based on the packets processed at block 510.

When the token bucket 505 receives a packet 515, TBAQM 500 may determine whether there are tokens remaining in the token bucket 505.

If there are tokens available, TBAQM 500 may compute a marking probability 545 based on the number of remaining tokens. In some examples, the marking probability 545 may correspond with the PIE or $PI^2$ processes implemented by TBAQM 500 to compute the marking probability 545 based on the number of tokens. In some examples, the marking probability 545 may correspond with the algorithm that can increase probability as the number of tokens decrease.

In some examples, TBAQM 500 may determine whether to mark the packet. TBAQM 500 may use a pseudo-random process 550 to decide if the packet must be marked. The pseudo-random process may be based on the marking probability.

In some examples, TBAQM 500 may let the packet pass unmodified to receiver computing device 130. This block may allow the packet to pass in an unmodified state, will not drop the packet, and will not mark the packet.

In some examples, TBAQM 500 may determine whether packet marking is enabled in the packet and/or whether packet marking is implemented and configured in TBAQM. The determination from this block may either drop the received packet as action 570 or change a value in the header of the received packet as action 570.

In some examples, TBAQM 500 may be statically configured to only drop packets or only do ECN (e.g., change the header value of the received packet) as action 570. In another example, packet marking may be done through changing one or more other fields in the packet header. For example, action 570 modifies the SCE bit of the type of service (ToS) field header in the packet header. In other examples, action 570 modifies the drop precedence in the DSCP field in the packet header. In yet another example, a bit in the TCP header of the packet indicates if this TCP connection does support ECN or not. If ECN support is indicated, then ECN marking is used. If ECN support is not indicated, packet dropping is used.

In some examples, the packet may be dropped and not sent to receiver computing device 130 as action 570. Otherwise, the packet value in the header may be changed as action 570. For example, the bit or flag in the TCP header part of the packet may be updated from zero to one to indicate congestion as action 570. Once the packet value is changed, the packet may be transmitted from TBAQM 500 to receiver computing device 130 as action 570.

In some examples, the AQM process may be re-implemented in the TBAQM 500 where the queue length variable is replaced by the difference between the size of the token bucket 505 and the number of tokens.

For example, a traditional AQM process may be adapted to a token bucket implementation, at least in part, using a correlation between a policer and a tail drop queue. Then, the policies that implement the AQM process can be applied to the tail drop queue corresponding to the token bucket. For example, the AQM process measures some property of the queue, so if the policer was replaced by a corresponding tail drop queue, some properties of the corresponding queue may also correlate with the AQM process.

In FIG. 5, the process may assume a token bucket 505 with rate TR, burst size BS (maximum number of tokens), and current number of tokens Tn. For simplicity, assume TR is provided in packets per second and packets arrive at the token bucket at rate SP. If a queue were implemented instead of token bucket 505, the corresponding queue would have a maximum size BS. The packets may be removed from the queue at rate TR, and the queue size would be Qn.

If SP is greater than TR (block 560), tokens may be consumed at block 510 at rate SP and replenished at block 520 at rate TR, so the net decrease rate is SP−TR, until Tn reaches zero. If a queue were implemented instead of token bucket 505, the corresponding queue would be filled at rate SP and emptied at rate TR. The net increase may correspond with SP−TR until Qn reaches BS. For the token bucket, once Tn reaches zero, the committed rate may be applied and packets may be dropped at rate SP−TR. For the queue, once Qn reaches BS, the queue may be full (in tail drop mode) and packets may be dropped at rate SP−TR.

If SP is less than TR, tokens may be replenished at block 520 at rate TR and consumed at block 510 at rate SP, so the net increase rate may be TR−SP until Tn reaches BS. If a queue were implemented instead of token bucket 505, the corresponding queue, it may be emptied at rate TR and filled at rate SP, so the net decrease may be TR−SP, until Qn reaches zero. For the token bucket, if Tn is not zero, no loss happens. For the queue, if Qn is not BS, no loss happens.

So, with respect to losses, the token bucket 505 may behave like a tail drop queue of same size and same rate, corresponding with Qn=BS−Tn. The correlation may apply to losses and queue size between the token bucket and the queue, and the delay of packet and the burstiness may be different between the token bucket and the queue. The computation of the delay with the queue may depend on the queue size Qn and the rate TR. The correlation between the queue and token bucket may also apply to the input of the queue (e.g., where packets are admitted to the queue) while the output of the token bucket and the output of queue can be different (e.g., the queue adds delay).

TBAQM 500 may also apply the AQM process to the state of the corresponding queue that matches the state of the token bucket 505. In some examples, a process somewhat similar to CoDel can be implemented (e.g., not the CoDel process since it is difficult to adapt to a token bucket). For example, on periodic basis, CoDel can drop packets from the output of the queue. This can be implemented with TBAQM 500 where packets are dequeued.

With PIE and $PI^2$, the processing may be completed at the input of the queue, when a data packet is received by the queue. When a data packet is received, the PIE or $PI^2$ process decides if it should be marked (e.g., dropped or modified) or enqueued. The fact that most of the processing is at the input of the queue, can make these processes highly compatible with a token bucket.

In some examples, PIE and $PI^2$ measure the queue length and the queue output rate to estimate the queue delay. Comparably, with a token bucket, the length of the corresponding queue is the difference between the bucket size and the number of tokens. For TBAQM 500 that implements token bucket 505, replace the queue length in the PIE and $PI^2$ processes with BS−Tn.

In some examples, PIE and $PI^2$ may use the average dequeue rate of the queue. In the corresponding queue, packets cannot be dequeued at a rate greater than TR (e.g., the committed rate of the token bucket 505). The average output rate of the token bucket (e.g., when busy) is its committed rate TR, so that the output rate of the corresponding queue would be the same and the rate cannot exceed TR. The rate can be less than TR if the input rate is lower than TR and the queue become temporarily empty.

However, by having a temporarily empty queue, this may cause starvation of the queue and negatively affect the estimation process of the rate for PIE and $PI^2$. In some examples, the estimation of packet delay in the queue assumes that the estimated rate when the queue is fully busy processing packets, because any queue starvation would not increase packet delay. PIE and $PI^2$ may ignore this underestimation of the rate because packet marking may only be needed when the queue is congested. For this reason, TR may be the proper estimate of the dequeue rate for the corresponding queue, and when modeling the process after PIE and $PI^2$, the estimated rate may be replaced with TR.

Packet marking may be implemented when the token bucket is congested. In some examples, the average output rate of the token bucket can correspond with its committed rate. The output rate of the corresponding queue can be the same, therefore when implementing the PIE and $PI^2$ processes, TBAQM can replace the estimated rate with TR. In this way, TBAQM 500 may include a token bucket with a modified PIE or $PI^2$ controller 545. The queue length variable may be replaced by the inverse of the number of remaining tokens, BS−Tn. The estimated rate variable may be replaced by the committed rate, TR.

In some examples, the PIE and $PI^2$ processes can also include two configuration parameters, alpha and beta, that help control the feedback. The PI controller 545 may compute the marking probability 'p' based on PIE or $PI^2$ process, and using BS−Tn, TR, alpha and beta. These parameters can depend on TCP congestion control and may be implemented with TBAQM 500. For example, PIE and $PI^2$ can mark the packet by either modifying or dropping it in action 570, depending on support for ECN and SCE. This can remain the same with a token bucket 500 implemented with TBAQM 500. In some examples, TBAQM 500 can generate ECN and SCE signals, which can help decrease packet losses.

Additional features may be implemented with TBAQM 500 that are somewhat similar to PIE and $PI^2$. For example, TBAQM 500 can implement one or more heuristics that are available in PIE. In $PI^2$, the marking probability can be used with TBAQM 500 to support multiple styles of congestion control (e.g., like classic TCP (probability is squared) and DCTCP (probability is not squared)). When PIE and $PI^2$ are applied this way to a token bucket 505, they can modify or drop packets as if the token bucket was replaced with a queue, so the impact on TCP can be the same.

TBAQM 500 can improve a policer by using PIE and $PI^2$ signal congestion (e.g., send early congestion signals) by regulating TCP congestion control properly. In this example, there may be less need to make the burst size of the token bucket 505 small because the traditional downsides associated with a large burst size may be much less likely to happen. The burst size can be safely increased, which can make the token bucket 505 more friendly to bursty traffic and also decrease packet losses. Through the use of a larger token bucket 505 size and ECN and SCE marking, TBAQM 500 can regulate TCP traffic with almost no packet losses and increase network efficiency.

Figure 6:
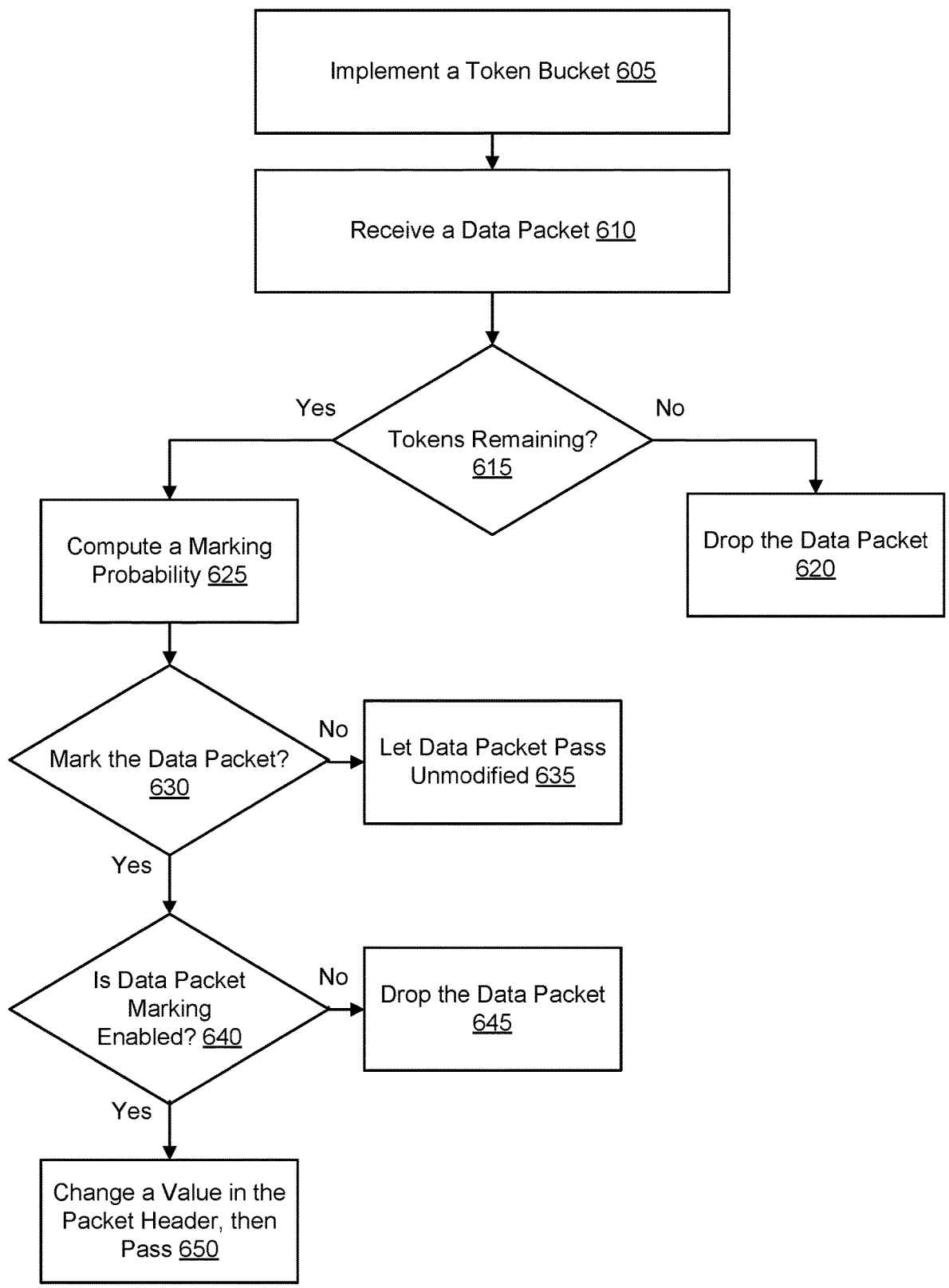
FIG. 6 illustrates a process implemented by the token bucket with active queue management (TBAQM), in accordance with some examples of the disclosure.

FIG. 6 illustrates a process implemented by the token bucket with active queue management (TBAQM), in accordance with some examples of the disclosure. In this illustration, TBAQM 500 of FIG. 5 can perform these steps.

At block 605, a token bucket 505 may be implemented with TBAQM 500. In this initial step, tokens may also be added to the token bucket based on a configured rate and subtracted based on the data packets processed.

At block 610, the token bucket 505 may receive a data packet.

At block 615, TBAQM may determine whether there are tokens remaining in the token bucket. If there are no tokens left, the process may proceed to block 620. If there are tokens left, the process may proceed to block 625.

At block 620, the received data packet is dropped.

At block 625, if there are tokens available, TBAQM may compute a marking probability based on the number of remaining tokens. In some examples, the marking probability may correspond with the PIE or $PI^2$ processes implemented by TBAQM to compute a marking probability based on the number of tokens. In some examples, the marking probability may correspond with the algorithm that can increase probability as the number of tokens decrease.

At block 630, TBAQM may determine whether to mark the data packet. TBAQM 500 may use a pseudo-random process to decide if the data packet must be marked. The pseudo-random process may be based on the marking probability. If no, the process may proceed to block 635. If yes, the process may proceed to block 640.

At block 635, TBAQM may let the packet pass unmodified to receiver computing device 130. This block may allow the packet to pass in an unmodified, will not drop the packet, and will not mark the packet.

At block 640, TBAQM may determine whether packet marking is enabled in the data packet and/or whether is data packet marking is implemented and configured in TBAQM 500. The determination from this block may either drop the received data packet or change a value in the header of the received data packet. If yes, the process may proceed to block 650. If no, the process may proceed to block 645.

Various implementations are possible for block 640. For example, TBAQM may be statically configured to only drop data packets or only do ECN. In another example, a bit in the TCP header of the data packet indicates if this TCP connection does support ECN or not. If ECN support is indicated, then ECN marking is used. If ECN support is not indicated, data packet dropping is used.

At block 645, the data packet may be dropped and not sent to receiver computing device 130.

At block 650, the packet value in the header may be changed. For example, the bit or flag in the TCP header part of the data packet may be updated from zero to one to indicate congestion. Once the packet value is changed, the data packet may be transmitted from TBAQM to receiver computing device 130.

In some examples, the AQM process may be implemented where the queue length variable is replaced by the difference between the bucket size and the number of tokens.

For example, a traditional AQM process may be adapted to a token bucket implementation, at least in part, using a correlation between a policer and a tail drop queue. Then, the policies that implement the AQM process can be applied to the tail drop queue corresponding to the token bucket. For example, the AQM process measures some property of the queue, so if the policer was replaced by a corresponding tail drop queue, some properties of the corresponding queue may also correlate with the AQM process.

In this illustration, assume a token bucket with rate TR, burst size BS (maximum number of tokens), and current number of tokens Tn. For simplicity, assume TR is provided in packets per second and data packets arrive at the token bucket at rate SP. The corresponding queue would have a maximum size BS. The data packets may be removed from the queue at rate TR, and the queue size would be Qn.

If SP is greater than TR, tokens may be consumed at rate SP and replenished at rate TR, so the net decrease rate is SP−TR, until Tn reaches zero. In the corresponding queue, it is filled at rate SP and emptied at rate TR. The net increase may correspond with SP−TR until Qn reaches BS. For the token bucket, once Tn reaches zero, the committed rate may be applied and data packets may be dropped at rate SP−TR. For the queue, once Qn reaches BS, the queue may be full (in tail drop mode) and data packets may be dropped at rate SP−TR.

If SP is less than TR, tokens may be replenished at rate TR and consumed at rate SP, so the net increase rate may be TR−SP until Tn reaches BS. In the corresponding queue, it may be emptied at rate TR and filled at rate SP, so the net decrease may be TR−SP, until Qn reaches zero. For the token bucket, if Tn is not zero, no loss happens. For the queue, if Qn is not BS, no loss happens.

So, with respect to losses, the token bucket may behave like a tail drop queue of same size and same rate, corresponding with Qn=BS−Tn. The correlation may apply to losses and queue size between the token bucket and the queue, and the delay of data packet and the burstiness may be different between the token bucket and the queue. The computation of the delay with the queue may depend on the queue size Qn and the rate TR. The correlation between the queue and token bucket may also apply to the input of the queue (e.g., where data packets are admitted to the queue) while the output of the token bucket and the output of queue can be different (e.g., the queue adds delay).

TBAQM may also apply the AQM process to the state of the corresponding queue that matches the state of the token bucket. In some examples, a process somewhat similar to CoDel can be implemented (e.g., not the CoDel process since it is difficult to adapt to a token bucket). For example, on periodic basis, CoDel can drop data packets from the output of the queue. This can be implemented with TBAQM where data packets are dequeued.

With PIE and $PI^2$, all the processing is done at the input of the queue, when a packet is received by the queue. When a data packet is received, the PIE or $PI^2$ process decides if it should be marked (e.g., dropped or modified) or enqueued. The fact that most of the processing is at the input of the queue can make these processes highly compatible with a token bucket.

In some examples, PIE and $PI^2$ measure the queue length and the queue output rate to estimate the queue delay. Comparably, with a token bucket, the length of the corresponding queue is the difference between the bucket size and the number of tokens. For TBAQM, replace the queue length in the PIE and $PI^2$ processes with BS−Tn.

In some examples, PIE and $PI^2$ may use the average dequeue rate of the queue. In the corresponding queue, the data packet cannot be dequeued at a rate greater than TR (e.g., the committed rate of the token bucket). The average output rate of the token bucket (e.g., when busy) is its committed rate TR, so that the output rate of the corresponding queue would be the same and the rate cannot exceed TR. The rate can be less than TR if the input rate is lower than TR and the queue become temporarily empty. However, this may cause starvation of the queue and negatively affect the estimation process of the rate for PIE and $PI^2$. In some examples, the estimation of packet delay in the queue assumes that the estimated rate when the queue is fully busy processing data packets, because any queue starvation would not increase packet delay. PIE and PI$^2$ may ignore this underestimation of the rate because packet marking may be needed when the queue is congested. For this reason, TR may be the proper estimate of the dequeue rate for the corresponding queue, and when modeling the process after PIE and PI$^2$, the estimated rate may be replaced with TR.

Packet marking may be implemented when the token bucket is congested. In some examples, the average output rate of the token bucket can correspond with its committed rate. The output rate of the corresponding queue can be the same, therefore when implementing the PIE and PI$^2$ processes, TBAQM can replace the estimated rate with TR. In this way, TBAQM may include a token bucket with a modified PIE or PI$^2$ controller. The queue length variable may be replaced by the inverse of the number of remaining tokens, BS−Tn. The estimated rate variable may be replaced by the committed rate, TR.

In some examples, the PIE and PI$^2$ processes can also include two configuration parameters, alpha and beta, that help control the feedback. These parameters can depend on TCP congestion control and may be implemented with TBAQM. For example, PIE and PI$^2$ can mark the data packet by either modifying or dropping it, depending on support for ECN and SCE. This can remain the same with a token bucket implemented with TBAQM. In some examples, TBAQM can generate ECN and SCE signals, which can help decrease data packet losses.

Additional features may be implemented with TBAQM that are somewhat similar to PIE and PI$^2$. For example, TBAQM can implement one or more heuristics that are available in PIE. In PI$^2$, the marking probability can be used with TBAQM to support multiple styles of congestion control (e.g., like classic TCP (probability is squared) and DCTCP (probability is not squared)). When PIE and PI$^2$ are applied this way to a token bucket, they can modify or drop data packets exactly as if the token bucket was replaced with a queue, so the impact on TCP can be the same.

TBAQM can improve PIE and PI$^2$ signal congestion (e.g., which can implement TCP too early) by regulating TCP congestion control properly. In this example, there may be less need to make the burst size of the token bucket small because the traditional downsides associated with a large burst size may be much less likely to happen. The burst size can be safely increased, which can make the token bucket more friendly to bursty traffic and also decrease data packet losses. Through the use of a larger bucket size and ECN and SCE marking, TBAQM can regulate TCP traffic with almost no data packet losses and increase network efficiency.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 7:
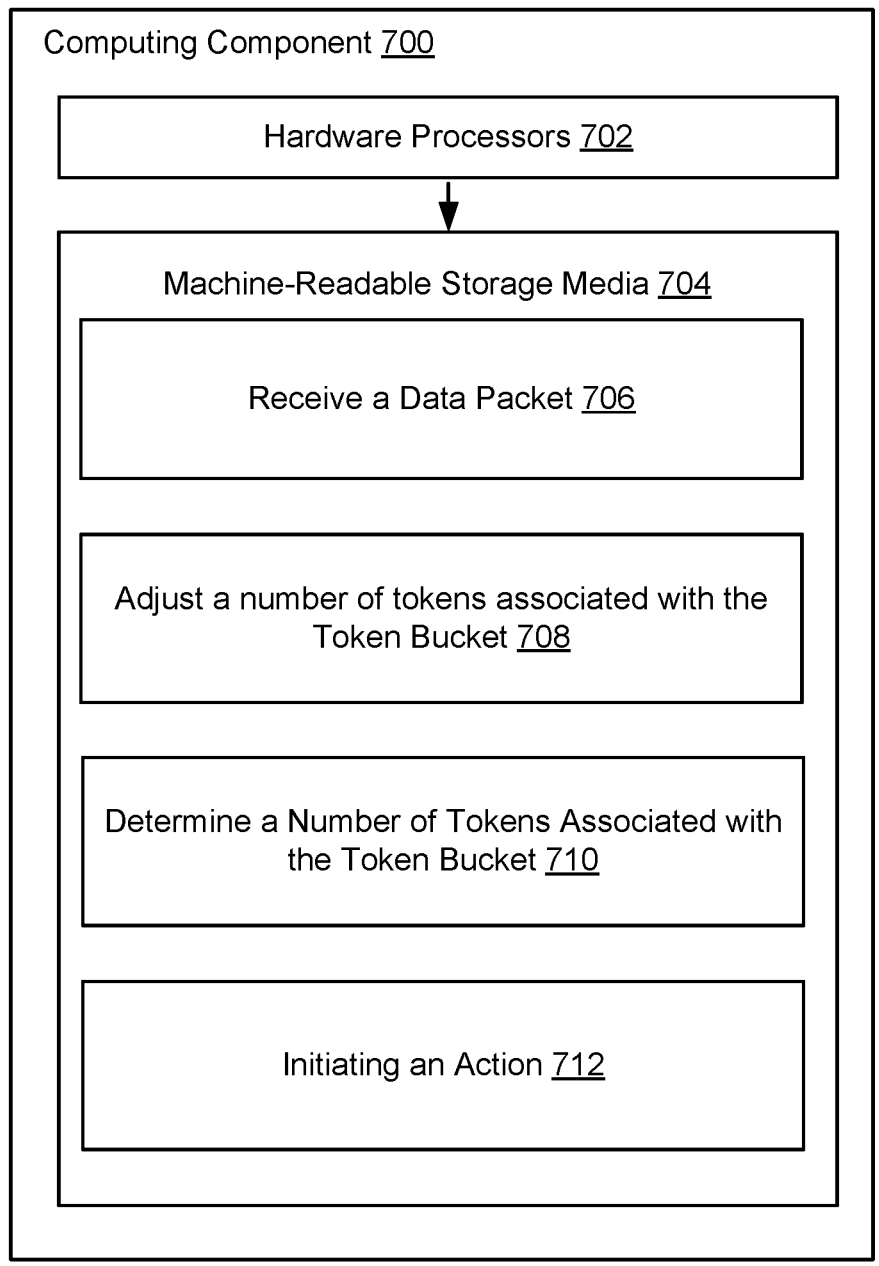
FIG. 7 is an example computing component that may be used to implement various features of examples described in the present disclosure.

FIG. 7 illustrates an example computing component that may be used to implement a token bucket with active queue management in accordance with various examples. Referring now to FIG. 7, computing component 700 may be, for example, a server computer, a controller, or any other similar computing component capable of processing data. In the example implementation of FIG. 7, the computing component 700 includes a hardware processor 702, and machine-readable storage medium for 704.

Hardware processor 702 may be one or more central processing units (CPUs), semiconductor-based microprocessors, and/or other hardware devices suitable for retrieval and execution of instructions stored in machine-readable storage medium 704. Hardware processor 702 may fetch, decode, and execute instructions, such as instructions 706-712, to control processes or operations for implementing a token bucket with active queue management. As an alternative or in addition to retrieving and executing instructions, hardware processor 702 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 704, may be any electronic, magnetic, optical, or other physical storage device that contains or stores executable instructions. Thus, machine-readable storage medium 704 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 704 may be a non-transitory storage medium, where the term "non-transitory" does not encompass transitory propagating signals. As described in detail below, machine-readable storage medium 704 may be encoded with executable instructions, for example, instructions 706-712.

Hardware processor 702 may execute instruction 706 to receive a data packet. For example, a network device comprising a controller (e.g., that implements a token bucket with active queue management (TBAQM)) may receive the data packet. The data packet may be processed by the TBAQM at the network device.

Hardware processor 702 may execute instruction 708 to adjust a number of tokens associated with the TBAQM. For example, the network device may adjust a number of tokens associated with the TBAQM, where the tokens are added based on a configured rate and subtracted in association with processing the data packet.

Hardware processor 702 may execute instruction 710 to determine a number of tokens associated with the TBAQM. For example, the network device may determine a number of tokens associated with the TBAQM. When the TBAQM has zero tokens, the network device may drop the data packet. When the TBAQM has more than zero tokens, the network device may determine a marking probability based on the number of tokens.

Hardware processor 702 may execute instruction 712 to initiate an action. For example, the network device may initiate an action based on the marking probability. More than one action may be performed, as described throughout the disclosure.

In some examples, the marking probability is based on the number of tokens. The network device may implement a pseudo-random process based on the marking probability; and based on the pseudo-random process, determine that the data packet will be marked as the action.

In some examples, when the data packet will be marked, determine to drop the data packet as the action. In some examples, when the data packet will be marked, determine to change a value in a header of the data packet as the action.

Figure 8:
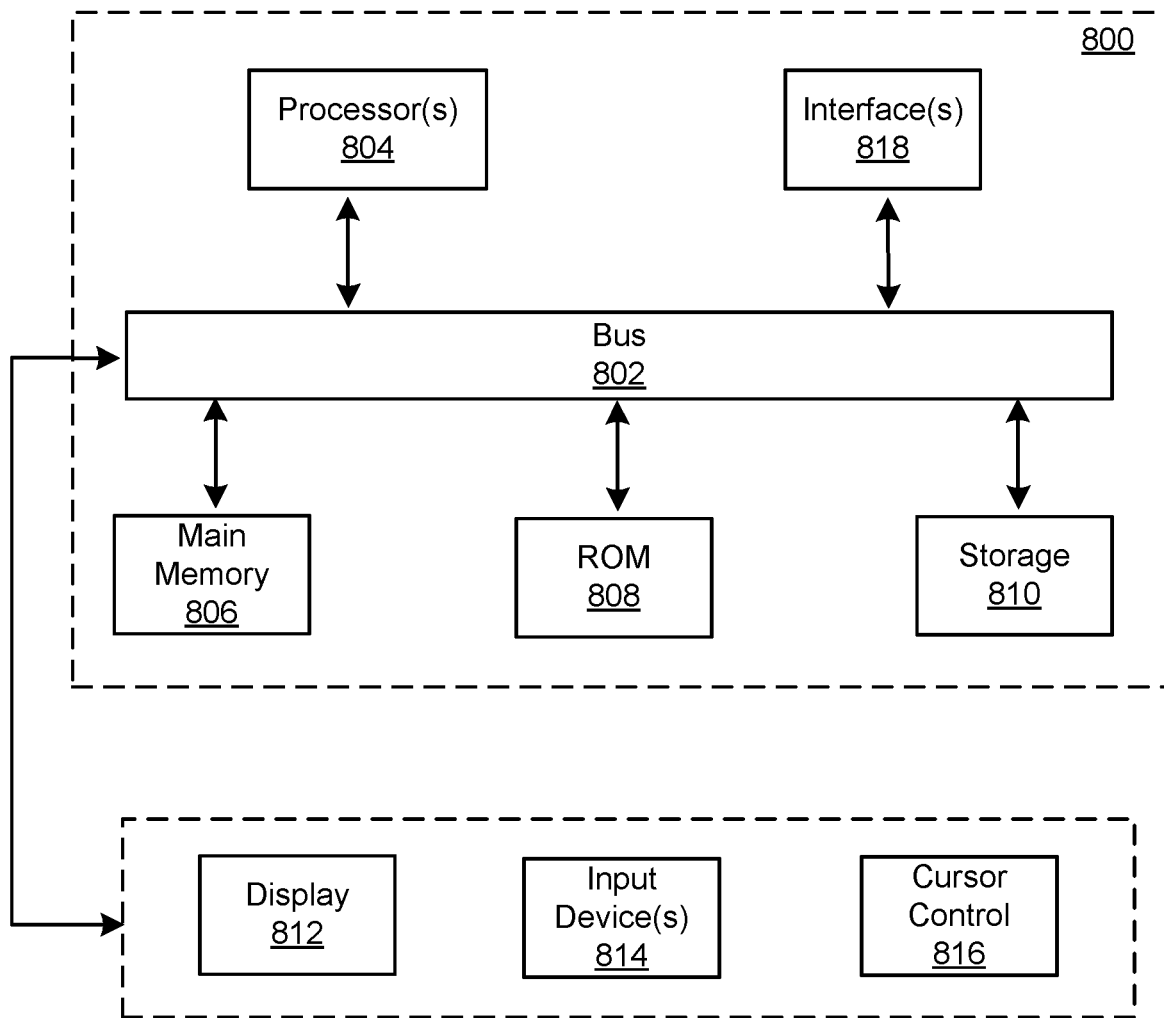
FIG. 8 depicts a block diagram of an example computer system in which various of the examples described herein may be implemented.

FIG. 8 depicts a block diagram of an example computer system 800 in which various of the examples described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some examples, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one example, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a communication interface 818 coupled to bus 802. Communication interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method comprising:
   receiving, at a network device comprising a token bucket, a data packet, wherein the data packet is processed by the token bucket at the network device;
   adjusting a number of tokens associated with the token bucket, wherein the tokens are added based on a configured rate and subtracted in association with processing the data packet;
   determining a number of tokens associated with the token bucket, comprising:
     when the token bucket has zero tokens, initiating a first action with the data packet; and
     when the token bucket has more than zero tokens:
       determining an Active Queue Management (AQM) technique that includes a queue length variable;
       replacing the queue length variable with a difference between a size of the token bucket and the number of tokens to generate an improved AQM technique;
       implementing the improved AQM technique at the network device to determine a marking probability; and
       initiating a second action based on the marking probability.

2. The method of claim 1, when the first action drops the data packet or modifies a header of the data packet.

3. The method of claim 1, when the marking probability based on the number of tokens is determined, the method further comprising:
   implementing a pseudo-random process based on the marking probability; and
   based on the pseudo-random process, determine that the data packet will be marked as the action.

4. The method of claim 3, wherein when the data packet will be marked, determine to drop the data packet as the action.

5. The method of claim 3, wherein when the data packet will be marked, determine to change a value in a header of the data packet as the action.

6. The method of claim 1, wherein determining the marking probability based on the number of tokens is done using a proportional integral (PI) controller.

7. The method of claim 1, wherein the marking probability is determined using a Proportional Integral controller Enhanced (PIE) algorithm.

8. The method of claim 1, wherein the marking probability is determined using a Proportional Integral improved with a square ($PI^2$) algorithm.

9. The method of claim 1, wherein the Active Queue Management (AQM) technique further includes a dequeue rate variable, the method further comprising:
  replacing the dequeue rate variable with the configured rate of the token bucket to generate a further improved AQM technique; and
  implementing the further improved AQM technique at the network device to determine the marking probability.

10. A network device comprising:
  a token bucket;
  a memory; and
  one or more processors that are configured to execute machine readable instructions stored in the memory for performing the method comprising:
  receive a data packet, wherein the data packet is processed by the token bucket at the network device;
  adjust a number of tokens associated with the token bucket, wherein the tokens are added based on a configured rate and subtracted in association with processing the data packet;
  determine a number of tokens associated with the token bucket, comprising:
    when the token bucket has zero tokens, initiate a first action with the data packet; and
    when the token bucket has more than zero tokens:
      determine an Active Queue Management (AQM) technique that includes a queue length variable;
      replace the queue length variable with a difference between a size of the token bucket and the number of tokens to generate an improved AQM technique;
      implement the improved AQM technique at the network device to determine a marking probability; and
      initiate a second action based on the marking probability.

11. The network device of claim 10, when the first action drops the data packet or modifies a header of the data packet.

12. The network device of claim 10, when the marking probability based on the number of tokens is determined, the method further comprising:
  implementing a pseudo-random process based on the marking probability; and
  based on the pseudo-random process, determine that the data packet will be marked as the action.

13. The network device of claim 12, wherein when the data packet will be marked, determine to drop the data packet as the action.

14. The network device of claim 12, wherein when the data packet will be marked, determine to change a value in a header of the data packet as the action.

15. The network device of claim 10, wherein determining the marking probability based on the number of tokens is done using a proportional integral (PI) controller.

16. A non-transitory computer-readable storage medium storing a plurality of instructions executable by one or more processors, the plurality of instructions when executed by the one or more processors cause the one or more processors to:
  receive a data packet, wherein the data packet is processed by a token bucket at a network device;
  adjust a number of tokens associated with the token bucket, wherein the tokens are added based on a configured rate and subtracted in association with processing the data packet;
  determine a number of tokens associated with the token bucket, comprising:
    when the token bucket has zero tokens, initiate a first action with the data packet;
    when the token bucket has more than zero tokens:
      determine an Active Queue Management (AQM) technique that includes a queue length variable;
      replace the queue length variable with a difference between a size of the token bucket and the number of tokens to generate an improved AQM technique;
      implement the improved AQM technique at the network device to determine a marking probability; and
      initiate a second action based on the marking probability.

17. The computer-readable storage medium of claim 16, wherein determining the marking probability based on the number of tokens is done using a proportional integral (PI) controller.

18. The computer-readable storage medium of claim 16, wherein the marking probability is determined using a Proportional Integral controller Enhanced (PIE) algorithm.

19. The computer-readable storage medium of claim 16, wherein the marking probability is determined using a Proportional Integral improved with a square ($PI^2$) algorithm.

* * * * *